US009300821B2

(12) United States Patent
Ohmori

(10) Patent No.: US 9,300,821 B2
(45) Date of Patent: Mar. 29, 2016

(54) SERVICE PROVIDING APPARATUS, SERVICE PROVIDING SYSTEM, SERVICE PROVIDING METHOD, AND NON-TRANSITORY COMPUTER-READABLE MEDIUM FOR NOTIFYING AN ADDED APPLICATION OF A DETECTED STATE OF A RESOURCE

(71) Applicant: FUJI XEROX CO., LTD., Minato-ku, Tokyo (JP)

(72) Inventor: Toshihide Ohmori, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/858,502

(22) Filed: Apr. 8, 2013

(65) Prior Publication Data

US 2014/0016154 A1    Jan. 16, 2014

(30) Foreign Application Priority Data

Jul. 10, 2012    (JP) ................................. 2012-154789

(51) Int. Cl.
*H04N 1/00*  (2006.01)

(52) U.S. Cl.
CPC ......... *H04N 1/00278* (2013.01); *H04N 1/0005* (2013.01); *H04N 1/00037* (2013.01); *H04N 1/00076* (2013.01); *H04N 1/00938* (2013.01); *H04N 2201/0093* (2013.01)

(58) Field of Classification Search
USPC .............................................. 358/1.13–1.15
See application file for complete search history.

(56) References Cited

U.S. PATENT DOCUMENTS

| 2004/0263897 | A1* | 12/2004 | Shimada et al. ............. 358/1.14 |
| 2005/0275887 | A1* | 12/2005 | Yamanaka .................... 358/1.15 |
| 2006/0080571 | A1  | 4/2006  | Ichinowatari |
| 2006/0256363 | A1* | 11/2006 | Kayahara ..................... 358/1.14 |
| 2007/0247654 | A1* | 10/2007 | Tian ...................... G06F 3/1219 358/1.14 |

FOREIGN PATENT DOCUMENTS

| JP | 2006-91343 A  | 4/2006  |
| JP | 2010-233253 A | 10/2010 |

OTHER PUBLICATIONS

Machine translation for JP 2010-233253, IDS.*
Communication dated Dec. 5, 2014 from the Australian Intellectual Property Office in counterpart application No. 2013205386.

* cited by examiner

Primary Examiner — Qian Yang
(74) Attorney, Agent, or Firm — Sughrue Mion, PLLC

(57) ABSTRACT

A service providing apparatus includes a detection section, an acquisition section, a memory, and a notification section. The detection section detects states of resources which are to be used for providing a service. When an application program which is to perform a service process is added to the apparatus, the acquisition section acquires resource information indicating a resource which is necessary for the application program to perform the service process. The memory stores the resource information and the information of the service process so as to associate the resource information and the information with the application program. When the application program is executed, the notification section specifies a resource associated with the application program, determines whether notification of the state of the specified resource is necessary, and, in a case where the notification is necessary, notifies the application program of information indicating the detected state of the specified resource.

14 Claims, 14 Drawing Sheets

| APPLICATION ID | DETAILS OF PROCESS | RESOURCE INFORMATION |
|---|---|---|
| ADDITIONAL APPLICATION 1 | COPY | Y TONER |
| | | M TONER |
| | | C TONER |
| | | K TONER |
| ADDITIONAL APPLICATION 2 | FAX | FAX LINE |
| | | NETWORK LINE |

US 9,300,821 B2

SERVICE PROVIDING APPARATUS, SERVICE PROVIDING SYSTEM, SERVICE PROVIDING METHOD, AND NON-TRANSITORY COMPUTER-READABLE MEDIUM FOR NOTIFYING AN ADDED APPLICATION OF A DETECTED STATE OF A RESOURCE

CROSS-REFERENCE TO RELATED APPLICATIONS

This application is based on and claims priority under 35 USC 119 from Japanese Patent Application No. 2012-154789 filed Jul. 10, 2012.

BACKGROUND

Technical Field

The present invention relates to a service providing apparatus, a service providing system, a service providing method, and a non-transitory computer-readable medium.

SUMMARY

According to an aspect of the invention, there is provided a service providing apparatus including a detection section, an acquisition section, a memory, and a notification section. The detection section detects states of multiple resources of the service providing apparatus. The multiple resources are resources to be used for providing a service. When an application program which is to perform a service process is added to the service providing apparatus, the acquisition section acquires resource information indicating a resource which is necessary for the added application program to perform the service process. The memory stores the resource information and information of the service process so as to associate the resource information and the information of the service process with the added application program. When the added application program is executed, the notification section specifies a resource which is associated with the added application program based on the information stored in the memory, determines whether it is necessary to notify the added application of the state of the specified resource, and, in a case where it is determined that it is necessary to notify the added application of the state of the specified resource, notifies the added application program of information indicating the detected state of the specified resource among the detected states of the multiple resources.

BRIEF DESCRIPTION OF THE DRAWINGS

Exemplary embodiments of the present invention will be described in detail based on the following figures, wherein.

DETAILED DESCRIPTION

Figure 1:
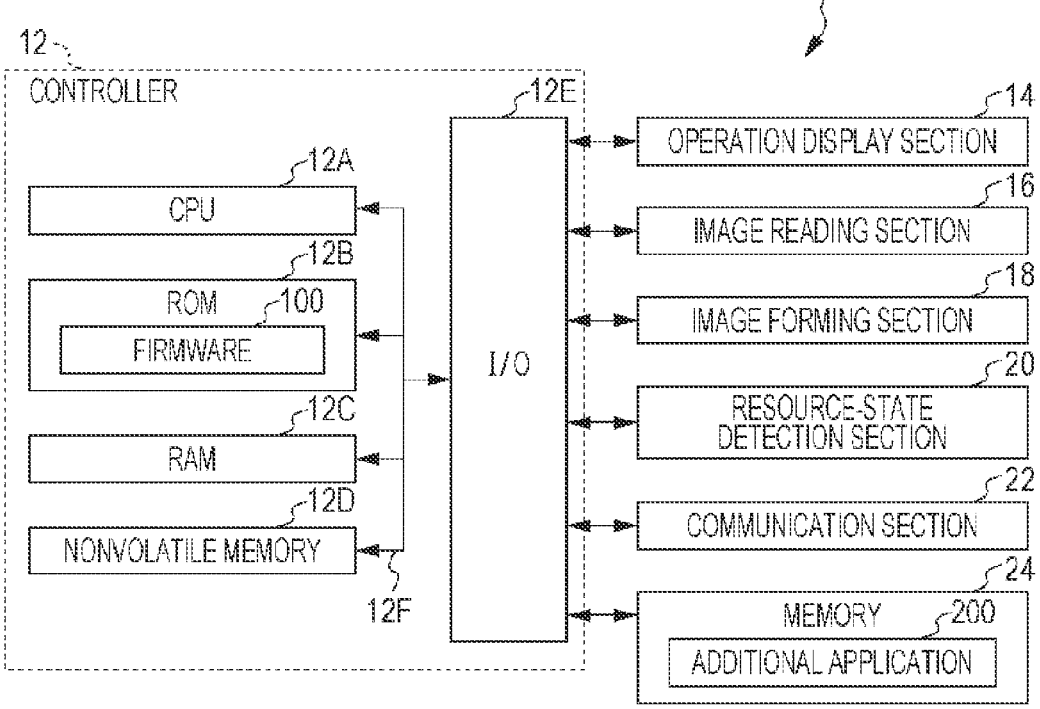
FIG. 1 is a block diagram illustrating an example of a configuration of a service providing apparatus according to an exemplary embodiment of the present invention.

Hereinafter, exemplary embodiments of the present invention will be described in detail with reference to the drawings.
Service Providing Apparatus First, a service providing apparatus according to an exemplary embodiment of the present invention will be described. The service providing apparatus is a multifunction machine that provides multiple service functions. The service providing apparatus according to the present exemplary embodiment provides multiple service functions that include at least a copy function, a print function, an image reading function, and a facsimile function. Note that, hereinafter, the image reading function may be referred to as a "scanner function", and the facsimile function may be referred to as a "fax function".
Overall Configuration of Service Providing Apparatus FIG. 1 is a block diagram illustrating an example of a configuration of the service providing apparatus according to the exemplary embodiment of the present invention. As illustrated in FIG. 1, the service providing apparatus 10 includes a controller 12, an operation display section 14, an image reading section 16, an image forming section 18, a resource-state detection section 20, a communication section 22, and a memory 24. Furthermore, the service providing apparatus 10 further includes, for example, a paper supplying section, a paper transport section, and a paper ejection section, which are not illustrated in FIG. 1. The paper supplying section supplies a sheet of paper stored in a paper storage section. The paper transport section transports the supplied sheet of paper. The paper ejection section ejects a sheet of paper on which an image is formed. Note that the configuration of the service providing apparatus 10 is an example, an unnecessary functional section may be removed, a new functional section may be added, and the configuration or disposition of each of the sections may be changed.

The controller 12 is configured as a computer that performs overall control of the service providing apparatus 10 and various types of computation. In other words, the controller 12 includes a central processing unit (CPU) 12A, a read only memory (ROM) 12B that stores various types of programs, a random access memory (RAM) 12C that is used as a working area when a program is executed, a nonvolatile memory 12D that stores various types of information, and an input/output (I/O) interface 12E. The CPU 12A, the ROM 12B, the RAM 12C, the nonvolatile memory 12D, and the I/O interface 12E are connected to each other via a bus 12F.

Each of the operation display section 14, the image reading section 16, the image forming section 18, the resource-state detection section 20, the communication section 22, and the memory 24 is connected to the I/O interface 12E of the controller 12. The controller 12 performs transmission/reception of information to/from the operation display section 14, the image reading section 16, the image forming section 18, the resource-state detection section 20, the communication section 22, and the memory 24, and controls each of the sections. For example, the controller 12 instructs the resource-state detection section 20 to detect states of resources, and acquires a detection result as necessary (for example, regularly).

The operation display section 14 is configured so as to include, for example, various types of buttons, such as a start button and numeric keypads, and a touch panel that is used to display various types of screens including a setting screen. With the above-mentioned configuration, the operation display section 14 accepts an operation performed by a user, and displays various types of information to the user. The image reading section 16 is configured so as to include, for example, an image reading device that optically reads an image formed on a sheet of paper, and a scanning mechanism that is used to scan a sheet of paper. With the above-mentioned configuration, the image reading section 16 reads an image formed on a sheet of document paper placed on the image reading section 16, and generates image information.

The image forming section 18 is a device that forms an image on a sheet of paper. For example, for a case of forming an image using an electrophotographic system, the image forming section 18 is configured so as to include, for example, an image forming unit and a fixing device. The image forming unit is configured so as to further include, for example, a photoconductor drum, a charging device, an exposure device, a developing device, a transfer device, and a cleaning device.

Here, an image forming operation using the electrophotographic system will be briefly described. The photoconductor drum is changed by the charging device. The exposure device exposes the surface of the charged photoconductor drum to light that is provided in accordance with an image. Accordingly, an electrostatic latent image is formed on the photoconductor drum in accordance with the image. The developing device develops, using toner, the electrostatic latent image formed on the photoconductor drum. The transfer device transfers, onto a sheet of paper, a toner image formed on the photoconductor drum. The fixing device fixes the toner image transferred onto the sheet of paper.

The resource-state detection section 20 is configured so as to include various types of sensors that detect states of resources of the service providing apparatus 10. The resource-state detection section 20 detects states of resources on the basis of outputs of the various types of sensors, and outputs information indicating the states of the resources.

Here, the term "resources" refers to objects or units that are used for providing a service. Examples of the resources include consumable items, such as toner, paper, and photoreceptors. Furthermore, in addition to the consumable items, examples of the resources also include a communication line, a recording device, a light source, and a power supply. When a resource is a consumable item, the state of the resource indicates at least one of the amount of the consumable item which remains, the fact that the amount of the consumable item which remains is insufficient, and whether or not the consumable item is available. When a resource is a communication line, the state of the resource indicates a connection state of the communication line.

The communication section 22 is an interface that is used to communicate with an external device via a wired or wireless communication line. For example, the communication section 22 functions as an interface that communicates with a computer connected to a network such as a local area network (LAN) or the Internet. In the case where the print function is provided, the communication section 22 acquires, from an external device such as a computer, by communicating with the external device, for example, image information or image formation information that is necessary to form an image. Moreover, the communication section 22 acquires, from an external device such as a computer, by communicating with the external device, an application program that performs a service process.

The memory 24 includes a storage device such as a hard disk. In the memory 24, various types of data, such as log data, various types of programs, and so forth are stored. In the present exemplary embodiment, a program that is implemented as firmware 100 is stored in advance in the ROM 12B of the controller 12. Furthermore, an application program 200 (hereinafter, referred to as an "additional application 200") that is acquired from an external device is stored in the memory 24. The program stored in the ROM 12B of the controller 12 and the program stored in the memory 24 are read and executed by the CPU 12A.

Note that various types of drives may be connected to the controller 12. Each of the various types of drives is a device that reads data from a computer-readable portable recording medium or that writes data on the recording medium. Examples of the recording medium include a flexible disk, a magnet-optical disk, a compact disc read-only memory (CD-ROM), and a universal serial bus (USB) memory. In the case where the various types of drives are provided, a program may be recorded on a portable recording medium, may be read by the corresponding drive, and may be executed.

Moreover, although an example in which an additional application is stored in the memory 24 is described in the present exemplary embodiment, the method for acquiring an additional application is not limited thereto. In the case where the service providing apparatus 10 includes a web browser, an additional application that operates on the web browser may be added. In this case, by using a function of the web browser, the service providing apparatus 10 may download an additional application from a web server connected to a network, and may cause the additional application to operate. Alternatively, the service providing apparatus 10 may communicate with a web server, and may execute an additional application.

Relationships Between Individual Programs

Figure 2:
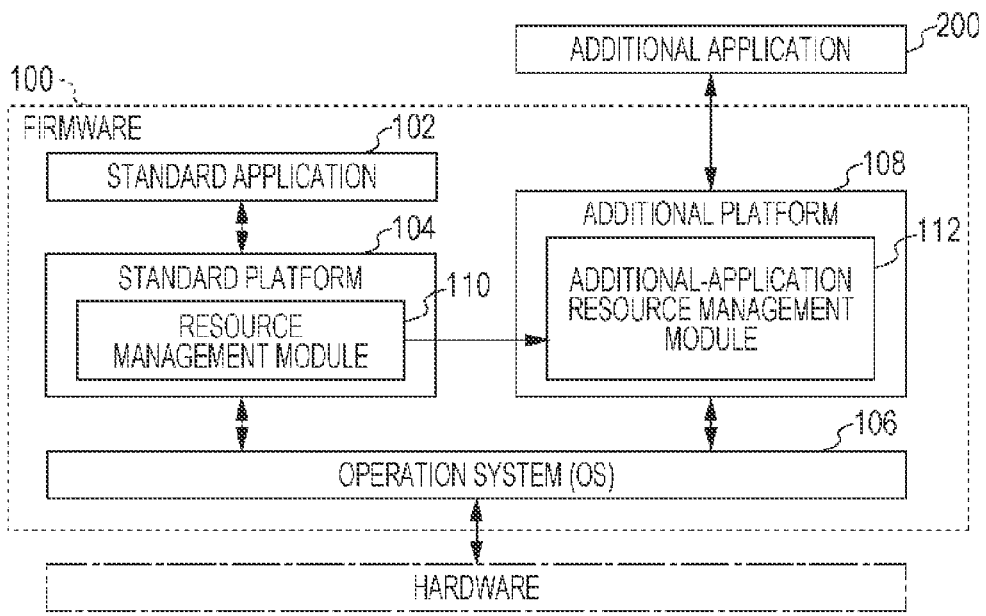
FIG. 2 is a schematic diagram illustrating examples of the relationships between individual programs that the service providing apparatus has.

Next, the relationships between the individual programs executed in the service providing apparatus 10 will be described. FIG. 2 is a schematic diagram illustrating examples of the relationships between the individual programs that the service providing apparatus has. As illustrated in FIG. 2, the firmware 100 stored in the ROM 12B of the controller 12 has a standard application 102, a standard platform 104, an operation system (OS) 106, and an additional platform 108. The additional application 200 is an application that is acquired from an external device and that is stored in the memory 24, and is provided outside the firmware 100.

The standard application 102 is a standard application program that is implemented in advance in order to perform a service process of providing a standard function (e.g., a copy function) of the service providing apparatus 10. In contrast, the additional application 200 is an application program that is acquired from an external device in order to perform a service process of providing an extended function (e.g., a simple copy function) for the service providing apparatus 10.

The standard platform 104 is a standard platform that is implemented in advance in order to cause the standard application 102 to operate on the OS 106. The additional platform 108 is an additional platform that is implemented in advance in order to cause the additional application 200 to operate on the OS 106. As described above, the additional application 200 operates on a mechanism (framework) that is different from a mechanism on which the standard application 102 implemented in the firmware 100 operates.

The OS 106 is software that manages an entire control system. In the present exemplary embodiment, the standard platform 104 and the additional platform 108 share hardware resources. Accordingly, the OS 106 also provides, for example, a function of arbitration of the shared resources and communication between the standard platform 104 and the additional platform 108. With this provided function, various types of service processes are executed using the hardware resources of the service providing apparatus 10 by each of the standard application 102 and the additional application 200.

The standard platform 104 has a resource management module 110 that is executed as a subroutine. The resource management module 110 performs, for the standard application 102, a process of managing information (hereinafter, referred to as "resource-state information") indicating the states of resources that have been detected by the resource-state detection section 20. Furthermore, the additional platform 108 has an additional-application resource management module 112 that is executed as a subroutine. The additional-application resource management module 112 performs, for the additional application 200, a process of managing resource-state information.

The resource management module 110 and the additional-application resource management module 112 are modules that operate independently of each other on different platforms. However, the resource management module 110 and the additional-application resource management module 112 are present in the firmware 100 that operates on the OS 106. Thus, the resource management module 110 and the additional-application resource management module 112 are able to transmit/receive information to/from each other.

More specifically, when the resource management module 110 acquires resource-state information from the resource-state detection section 20, in the case where the resource-state information is resource-state information that is necessary for the standard application 102, the resource management module 110 notifies the standard application 102 of the resource-state information. Moreover, the resource management module 110 notifies the additional-application resource management module 112 of the acquired resource-state information. In the case where the resource-state information is resource-state information that is necessary for the additional application 200, the additional-application resource management module 112 notifies the additional application 200 of the resource-state information.

Notification of Resource-State Information to Additional Application

Next, notification of resource-state information to the additional application 200 will be described.

In the present exemplary embodiment, as described above, because the additional-application resource management module 112 is implemented, the additional application 200 is also notified of resource-state information. Hereinafter, the procedure of a notification operation will be described in chronological order.

Overview of Notification Operation

Figure 3:
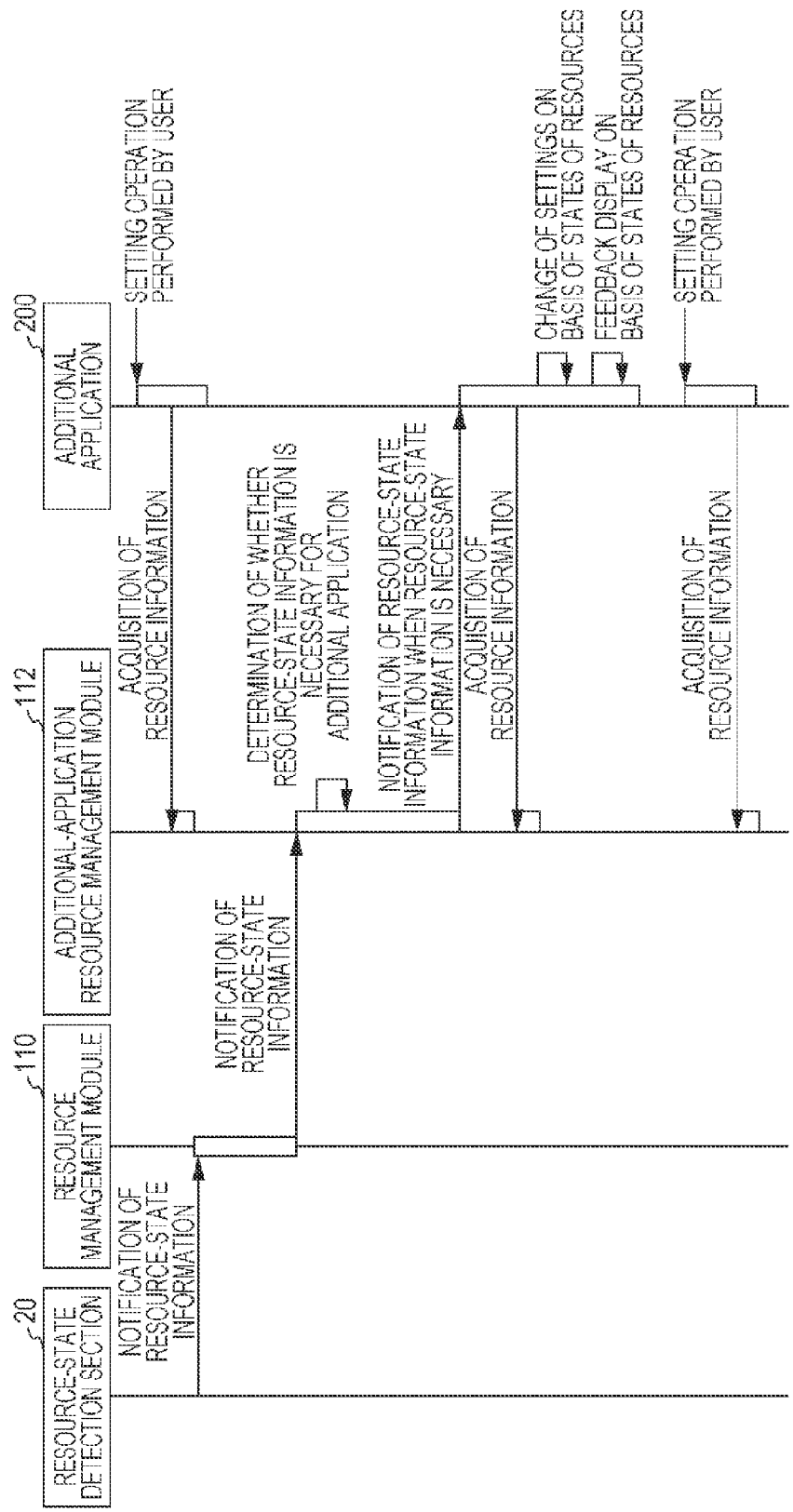
FIG. 3 is a sequence diagram illustrating an example of an operation of notifying an additional application of resource-state information.

FIG. 3 is a sequence diagram illustrating an example of the notification operation of notifying the additional application 200 of resource-state information.

As illustrated in FIG. 3, when the additional application 200 accepts a setting operation performed by the user, the additional application 200 requests the additional-application resource management module 112 to notify the additional application 200 of resource-state information. In the present exemplary embodiment, when the additional application 200 is acquired from an external device (when the additional application 200 is registered), the additional-application resource management module 112 performs an "additional-application registration process" of acquiring resource information from the additional application 200.

In the present exemplary embodiment, the resource-state detection section 20 regularly notifies the resource management module 110 of resource-state information. When the resource management module 110 has been notified of the resource-state information from the resource-state detection section 20, the resource management module 110 notifies the additional-application resource management module 112 of the resource-state information that the resource management module 110 has been notified of. The additional-application resource management module 112 determines whether or not the resource-state information which the additional-application resource management module 112 has been notified of is resource-state information which is necessary for the additional application 200. When it is determined that the resource-state information which the additional-application resource management module 112 has been notified of is resource-state information necessary for the additional application 200, the additional-application resource management module 112 notifies the additional application 200 of the resource-state information.

The additional application 200 performs a service process on the basis of the acquired resource-state information. For example, the additional application 200 may change settings on the basis of the acquired resource-state information, and may perform a process based on the states of resources (hereinafter, also referred to as a "resource-state-based service process"). Alternatively, the additional application 200 may notify, for example, using feedback display, the user of the acquired resource-state information or whether or not provision of a service based on the acquired resource-state information is available. When the additional application 200 accepts a setting operation (an operation of changing the settings) from the user because the user has been notified of the resource-state information or the like, the additional application 200 may acquire resource-state information again from the additional-application resource management module 112, and may perform a service process based on states of resources.

Note that the additional application 200 may request the additional-application resource management module 112 to notify the additional application 200 of resource-state information at timing according to the procedure of a service process. Furthermore, in the present exemplary embodiment, an example in which the additional-application resource management module 112 acquires resource information when the additional application 200 is registered is described. However, the additional-application resource management module 112 may acquire resource information from the additional application 200 as necessary. For example, the additional-application resource management module 112 may acquire resource information from the additional application 200 every time the additional-application resource management module 112 is requested to notify the additional application 200 of resource-state information.

Operation of Additional-Application Resource Management Module

Next, an operation of the additional-application resource management module 112 will be described.

Figure 4:
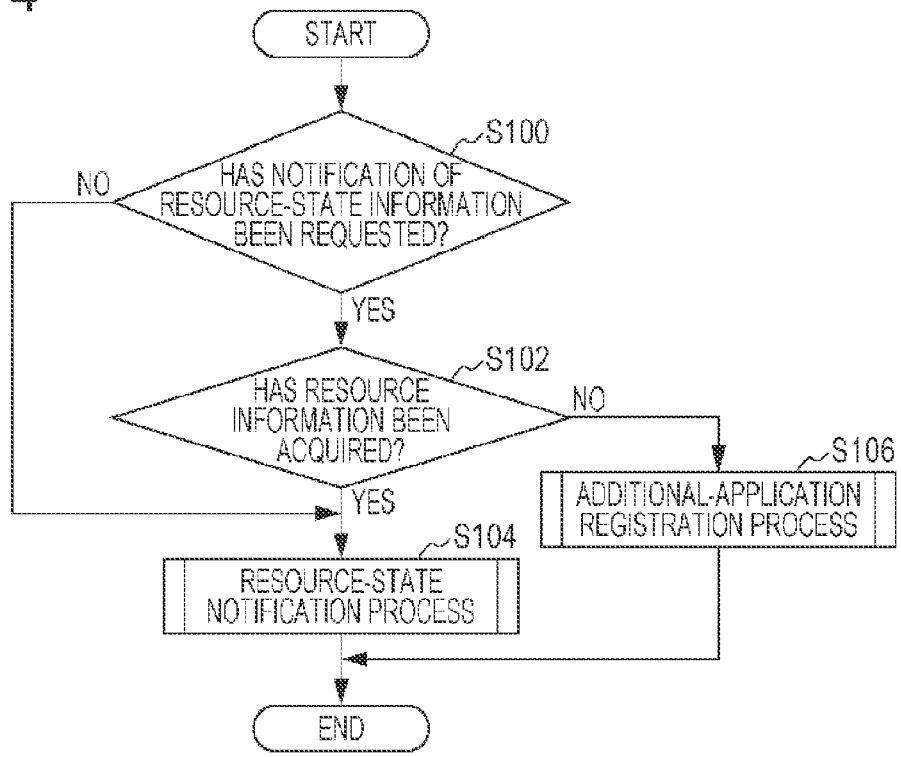
FIG. 4 is a flowchart illustrating the procedure of a process performed by an additional-application resource management module.

FIG. 4 is a flowchart illustrating the procedure of a process performed by the additional-application resource management module. The procedure of the process illustrated in FIG. 4 is started when the additional-application resource management module 112 has received any information. As illustrated in FIG. 4, in step S100, whether or not notification of resource-state information has been requested from the additional application 200 is determined. When notification of resource-state information has been requested, the process proceeds to step S102. When notification of resource-state information has not been requested from the additional application 200, the received information is resource-state information that the additional-application resource management module 112 has been notified of from the resource management module 110. Accordingly, the process proceeds to step S104, and a "resource-state notification process", which is described below, is performed.

In step S102, whether or not resource information has been acquired from the additional application 200 that is a source of the request is determined. Here, "resource information" is information indicating resources that are necessary for the additional application 200 to perform a service process. When resource information has been acquired from the additional application 200, the process proceeds to step S104, and the "resource-state notification process", which is described below, is performed. When no resource information has been acquired from the additional application 200, the process proceeds to step S106, and an "additional-application registration process", which is describe below, is performed. Note that notification of resource-state information may be requested from the additional application 200 also in cases other than the case where the additional application 200 is registered. In such a case, the "resource-state notification process" is performed without performing the "additional-application registration process". Alternatively, the "additional-application registration process" may be performed to update the resource information.

Additional-Application Registration Process

Next, the additional-application registration process will be described.

Figure 5:
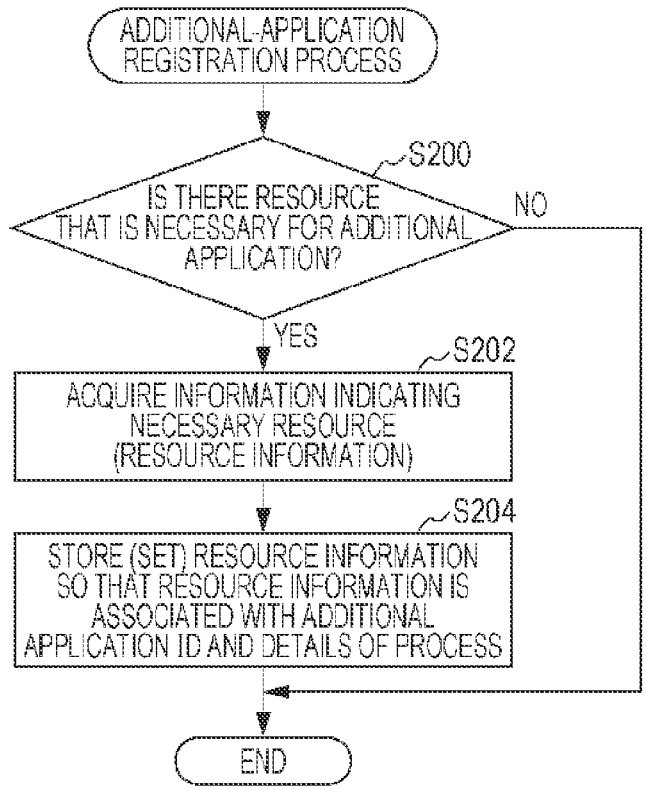
FIG. 5 is a flowchart illustrating the procedure of an "additional-application registration process"
Figures 6A, 6B:
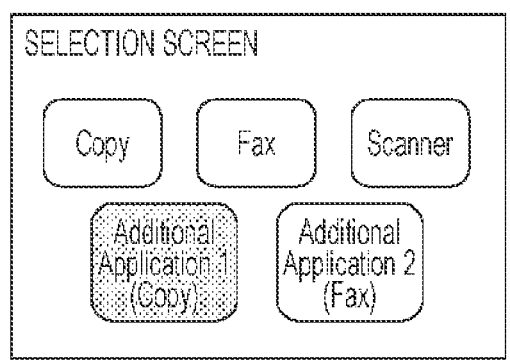
FIG. 6A is a diagram illustrating an example of a table in which the details of a process and resource information are stored for each additional application.
FIG. 6B is a plan view illustrating an example of a selection screen used to select an additional application.

FIG. 5 is a flowchart illustrating the procedure of the "additional-application registration process". FIG. 6A is a diagram illustrating an example of a table in which the details of a process and resource information are stored for each additional application. FIG. 6B is a plan view illustrating an example of a selection screen used to select an additional application.

As illustrated in FIG. 5, first, in step S200, whether or not there is a resource that is necessary for the additional application 200 to perform a service process is determined. When there is a necessary resource, the process proceeds to step S202, and information indicating the necessary resource (resource information) is acquired. When there is not any necessary resource, the routine finishes.

Next, in step S204, the acquired resource information is stored in a storage device, such as the memory 24, so that the resource information is associated with an additional-application identification (ID), by which the additional application 200 is identified, the details of a service process which is to be performed by the additional application 200, and so forth. The routine finishes. In other words, when a resource necessary to perform a service process is set for the additional application 200, the process of registering the additional application 200 finishes.

Note that the relationships among additional applications, resource information, and the details of processes may be stored in, for example, the table illustrated in FIG. 6A. The stored relationships are read and used as necessary. In the table illustrated in FIG. 6A, an additional application 1 is an application that performs a "copy" process. An expression "Y toner, M toner, C toner, K toner" is set as resource information. Furthermore, an additional application 2 is an application that performs a "fax" process, and an expression "fax line, network line" is set as resource information.

Additionally, for the registered additional application 200, an alternative corresponding to the additional application 200 is displayed in, for example, the selection screen illustrated in FIG. 6B, whereby the user is able to select the additional application 200 and to provide an instruction to execute the additional application 200. In the selection screen illustrated in FIG. 6B, expressions "additional application 1 (copy)" and "additional application 2 (fax)" are displayed as alternatives corresponding to the additional application 1 and the additional application 2, respectively.

Resource-State Notification Process

Next, the resource-state notification process will be described.

Figure 7:
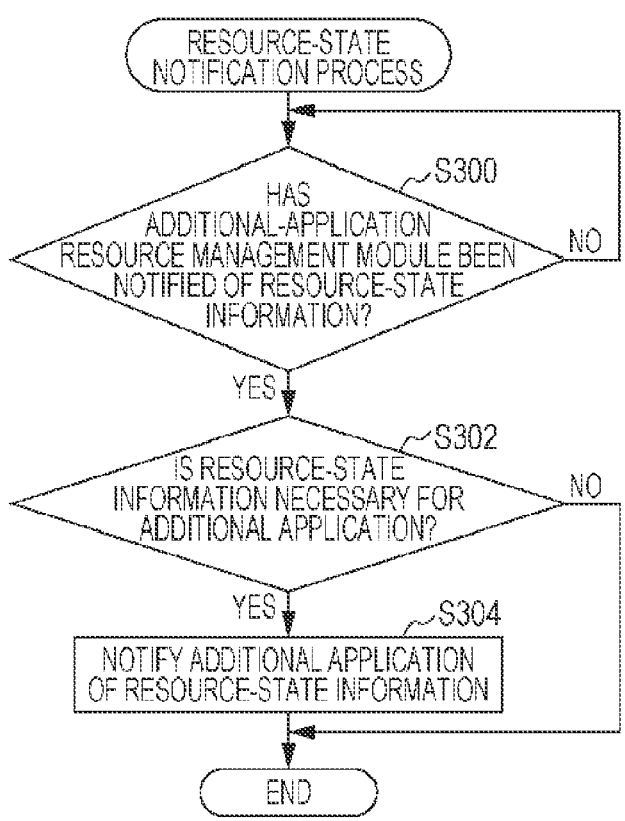
FIG. 7 is a flowchart illustrating the procedure of a "resource-state notification process"

FIG. 7 is a flowchart illustrating the procedure of the "resource-state notification process". As illustrated in FIG. 7, in step S300, whether or not the additional-application resource management module 112 has been notified of resource-state information from the resource management module 110 is determined. When the additional-application resource management module 112 has been notified of resource-state information, the process proceeds to step S302. The determination process of step S300 is repeatedly performed until the additional-application resource management module 112 is notified of resource-state information.

Next, in step S302, whether or not the resource-state information that the additional-application resource management module 112 has been notified of is resource-state information that is necessary for the additional application 200 which is being executed is determined on the basis of the relationships among additional applications, resource information, and the details of processes which are stored in advance. Note that which additional application 200 is being executed or not is determined using a request for notification of resource-state information which has been made from the additional application 200, a notification of the start of a process which has been provided from additional application 200, or the like. For example, in the case where the additional application 200 is the "Additional Application 1 (Copy)", with reference to the table illustrated in FIG. 6A, when the additional-application resource management module 112 has been notified of resource-state information concerning the "Y toner, M toner, C toner, and K toner", it is determined that the resource-state information which the additional-application resource management module 112 has been notified of is necessary resource-state information.

When the resource-state information that the additional-application resource management module 112 has been notified of is resource-state information necessary for the additional application 200, the process proceeds to step S304, and the additional application 200 is notified of the resource-state information. When the resource-state information that the additional-application resource management module 112 has been notified of is resource-state information that is not necessary for the additional application 200, the routine finishes without notifying the additional application 200 of the resource-state information. Accordingly, the additional application 200 that is being executed is not notified of unnecessary resource-state information, and is notified of only necessary resource-state information.

Service Process Performed by Additional Application Overview of Operation of Performing Service Process Next, a service process performed by the additional application 200 will be described.

Figure 8:
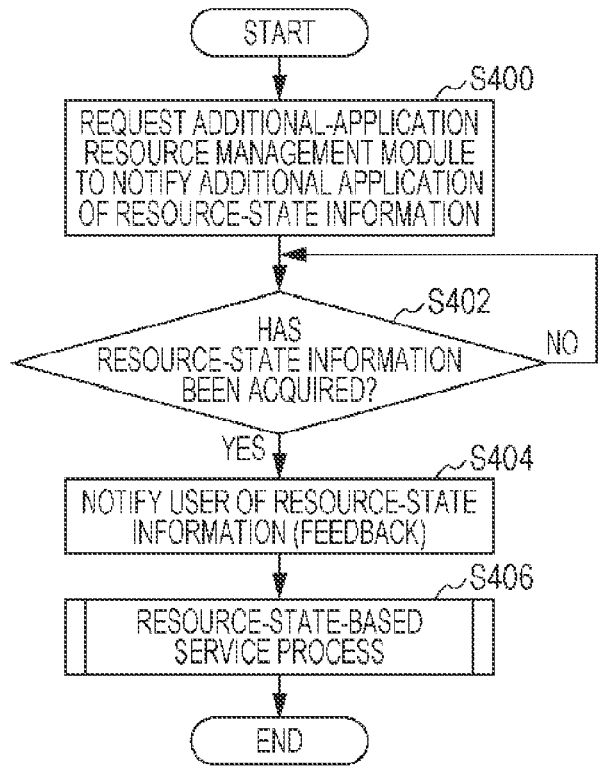
FIG. 8 is a flowchart illustrating the procedure of an additional application.

FIG. 8 is a flowchart illustrating the procedure of a process performed by the additional application. When the additional application 200 has been selected by the user and an instruction to execute the additional application 200 has been provided by the user, the procedure of the process illustrated in FIG. 8 is started. As illustrated in FIG. 8, in step S400, the additional application 200 requests the additional-application resource management module 112 to notify the additional application 200 of resource state information.

Next, in step S402, whether or not resource-state information has been acquired from the additional-application resource management module 112 is determined. When resource-state information has been acquired, the process proceeds to step S404. The additional application 200 is notified of resource-state information in response to a request from the additional application 200. Thus, it may take time to notify the additional application 200 of resource-state information. Accordingly, the determination process of step S402 is repeatedly performed until resource-state information is acquired.

Next, in step S404, for example, a notification screen indicating the resource-state information is displayed over the entire display section of the operation display section 14, whereby the user is notified of the resource-state information. Accordingly, the resource-state information is fed back to the user. Next, in step S406, the "resource-state-based service process", which is described below, is performed, and the routine finishes.

Resource-State-Based Service Process

Next, the resource-state-based service process will be described.

Figure 9:
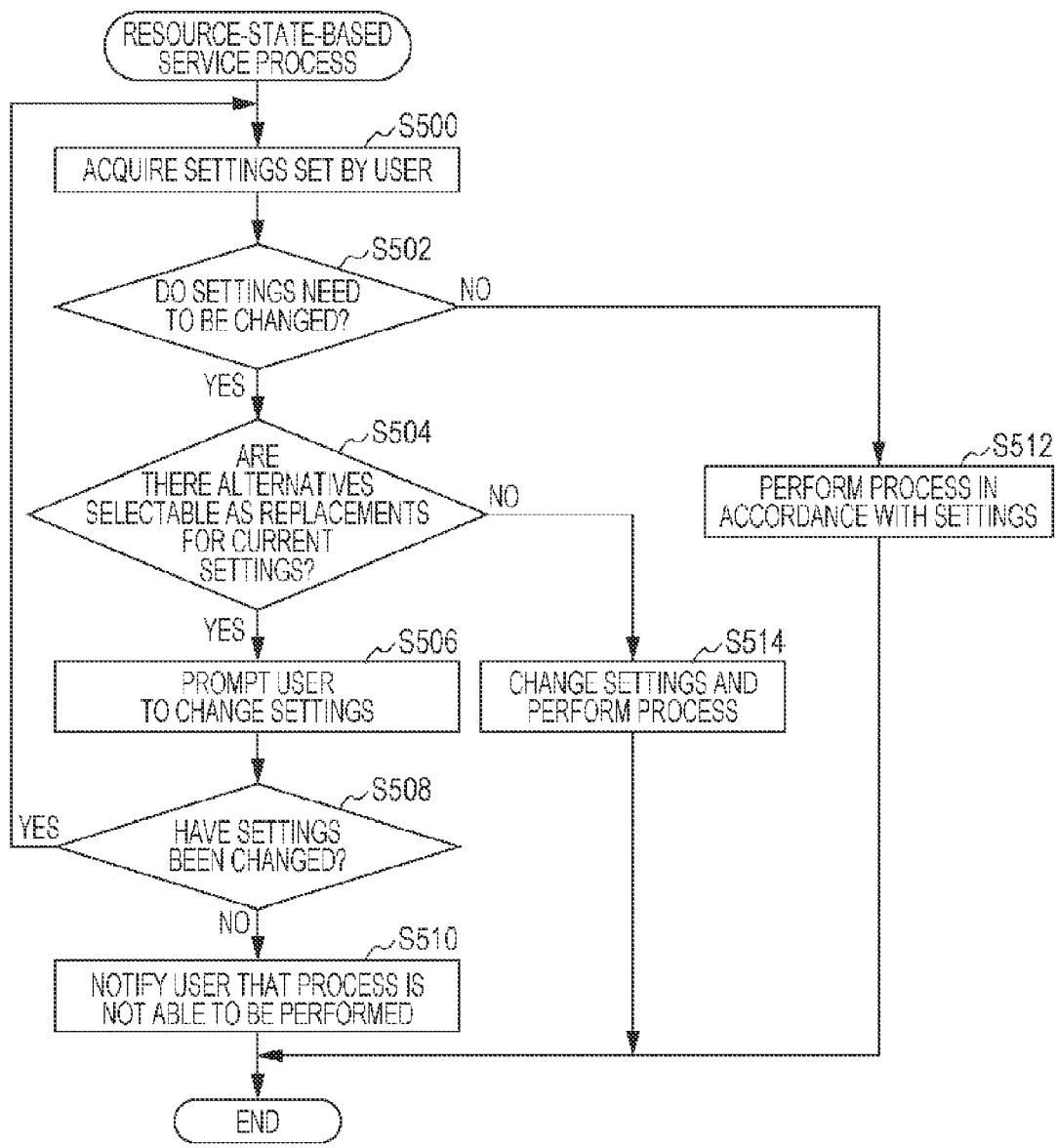
FIG. 9 is a flowchart illustrating the procedure of a "resource-state-based service process"

FIG. 9 is a flowchart illustrating the procedure of the "resource-state-based service process". As illustrated in FIG. 9, in step S500, settings set by the user are acquired. For example, in a copy process, various settings, such as a setting of black-and-white copy/color copy, a setting of the number of sheets to be copied, a setting of a sheet size, and a setting of zooming-in/zooming-out, are set by the user.

Next, in step S502, whether or not the settings need to be changed is determined on the basis of the acquired resource-state information. When the settings need to be changed, the process proceeds to step S504. When the settings do not need to be changed, the process proceeds to step S512. A certain process is performed in accordance with the settings, and the routine finishes.

Next, in step S504, whether or not there are alternatives selectable as replacements for the current settings is determined on the basis of the acquired resource-state information. In other words, supposing that the settings have been changed, whether or not there are two or more manners in which the certain process is able to be performed using the changed settings is determined. When there are two or more manners in which the certain process is able to be performed using the changed setting, the process proceeds to step S506. When there is only one manner in which the certain process is able to be performed using the changed settings, the process proceeds to step S514. The settings are changed so that the certain process is to be performed in only the manner, and the certain process is performed.

Next, in step S506, for example, a screen that prompts the user to change the settings is displayed on the operation display section 14, thereby prompting the user to change the settings. Next, in step S508, whether or not the settings have been changed, i.e., whether or not an operation, which has been performed by the user, of chaining the settings has been accepted, is determined. When the settings have been changed, the process returns to step S500, and the processes of steps S500 to S508 (including steps S512 and S514) are repeatedly performed. When the settings have not been changed, the process proceeds to step S510. The user is notified that the certain process is not able to be performed, and the routine finishes.

First Specific Example

A first specific example of the service providing apparatus will be described.

Figure 10:
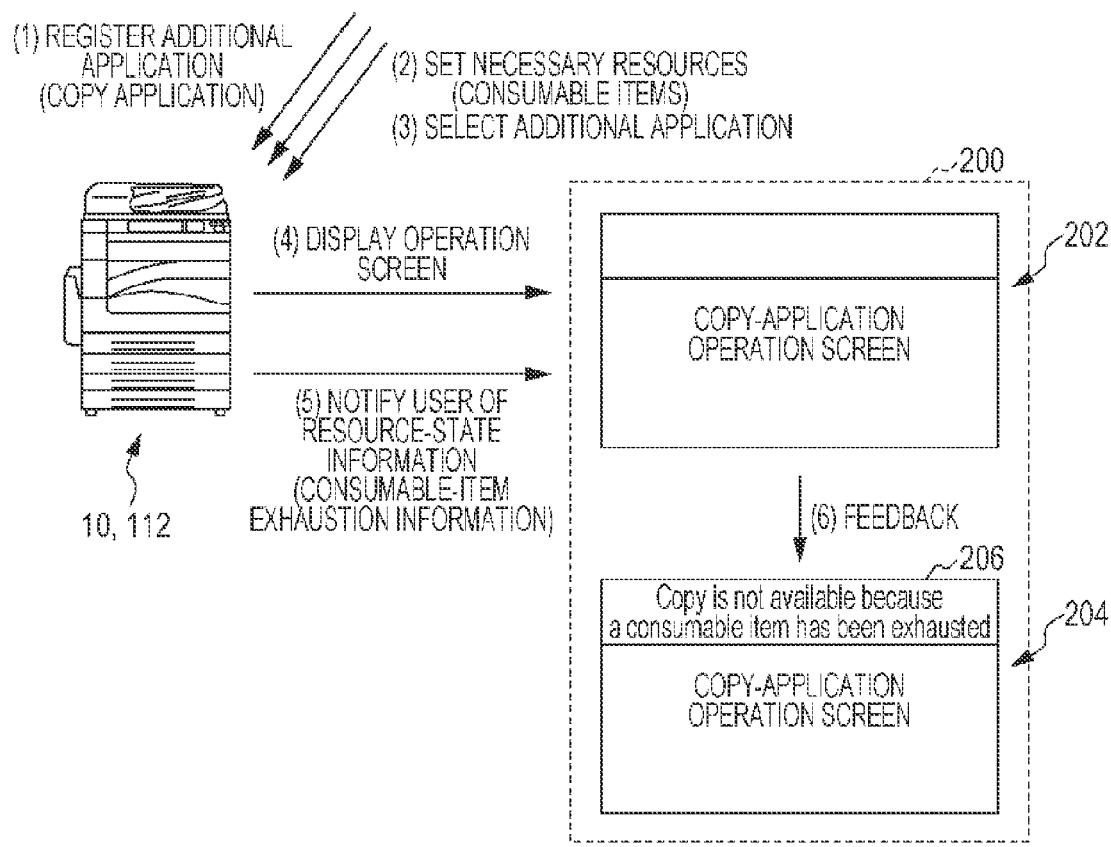
FIG. 10 is a schematic diagram illustrating an example of a case where an additional application having a copy function is registered.
Figure 11:
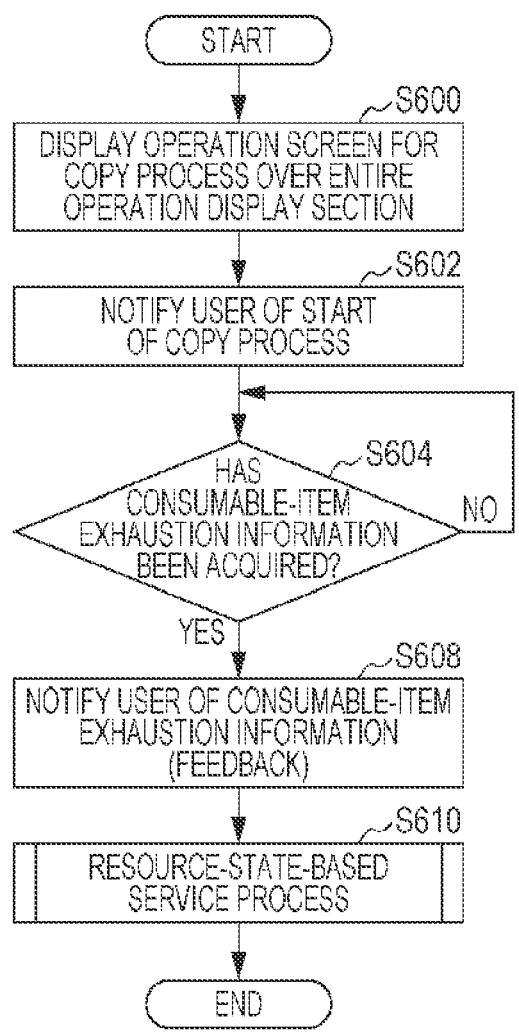
FIG. 11 is a flowchart illustrating an example of an operation of the additional application illustrated in FIG. 10.

FIG. 10 is a schematic diagram illustrating an example in a case where an additional application having a copy function is registered. FIG. 11 is a flowchart illustrating the procedure of a service process performed by the additional application illustrated in FIG. 10. Note that the numbers illustrated in FIG. 10 indicate that processes denoted by the numbers are performed in ascending order.

In the first specific example, as illustrated in FIG. 10, a "copy application" that provides a copy function to perform a copy process is registered as the additional application 200. An expression "consumable items" is set as resource information concerning the additional application 200. The additional application 200 is notified of "consumable-item exhaustion information" as resource-state information. The procedure of the process illustrated in FIG. 11 is started when the additional application 200 has been selected and an instruction to execute the additional application 200 has been provided.

As illustrated in FIG. 11, in step S600, an operation screen 202 for a copy process is displayed over the entire operation display section 14. Next, in step S602, the additional-application resource management module 112 is notified of the start of the copy process. Next, in step S604, whether or not consumable-item exhaustion information has been acquired from the additional-application resource management module 112 is determined. The determination process of step S604 is repeatedly performed until consumable-item exhaustion information is acquired. When consumable-item exhaustion information has been acquired, the process proceeds to step S608.

Next, in step S608, the user is notified of the consumable-item exhaustion information. The consumable-item exhaustion information is fed back to the user. For example, an operation screen 204 including a message display part 206 is displayed, and, in the message display part 206, a message, for example, "Copy is not available because a consumable item has been exhausted" is displayed, thereby notifying the user of the consumable-item exhaustion information. Next, in step S610, the "resource-state-based service process", which is described above, is performed, and the routine finishes.

Note that the procedure of the service process performed by the additional application illustrated in FIG. 11 is an example, and the process or the procedure may be changed. For example, in the case where no consumable-item exhaustion information has been acquired even when a predetermined time period has elapsed, the process may proceed to step S610 without notifying the user of consumable-item exhaustion information, and the "resource-state-based service process" may be performed. Alternatively, in the case where no consumable-item exhaustion information has been acquired even when a predetermined time period has elapsed, the operation screen 204 including the message display part 206 may be displayed, and, in the message display part 206, a message, for example, "Consumable items exist" may be displayed, whereby the user may be notified that no consumable-item exhaustion information has been acquired.

Second Specific Example

A second specific example of the service providing apparatus will be described.

Figure 12:
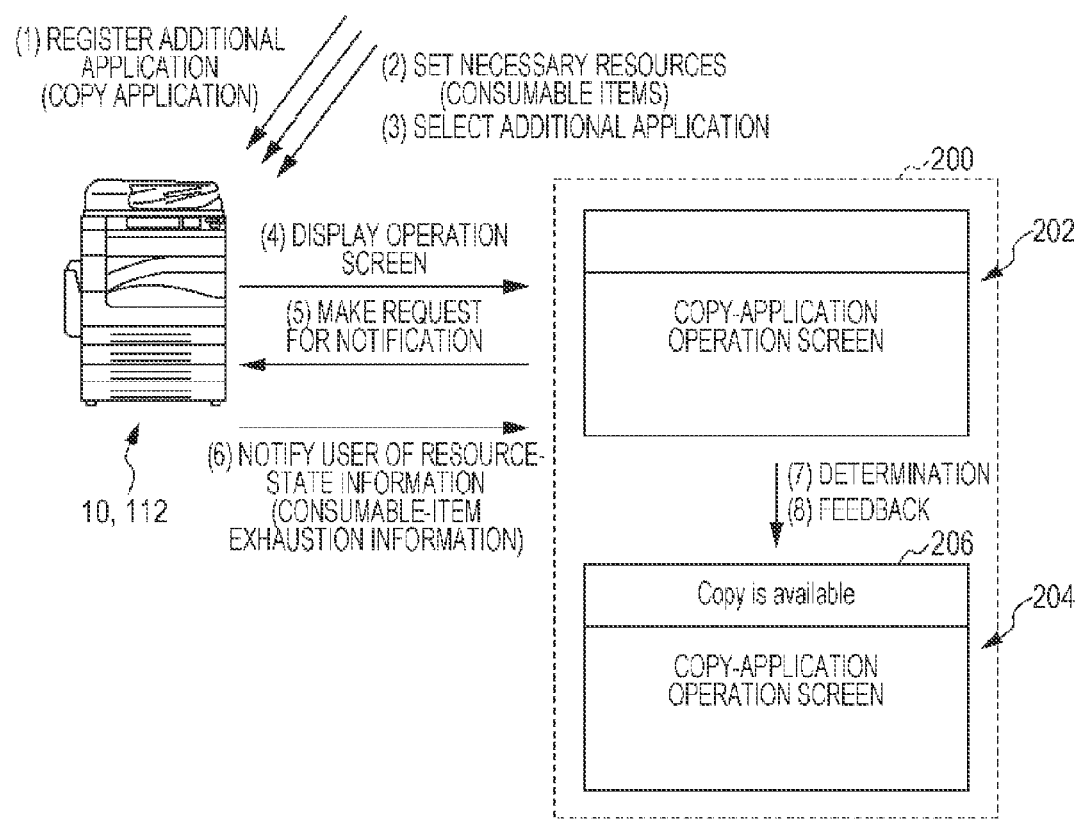
FIG. 12 is a schematic diagram illustrating another example of the case where an additional application having a copy function is registered.
Figure 13:
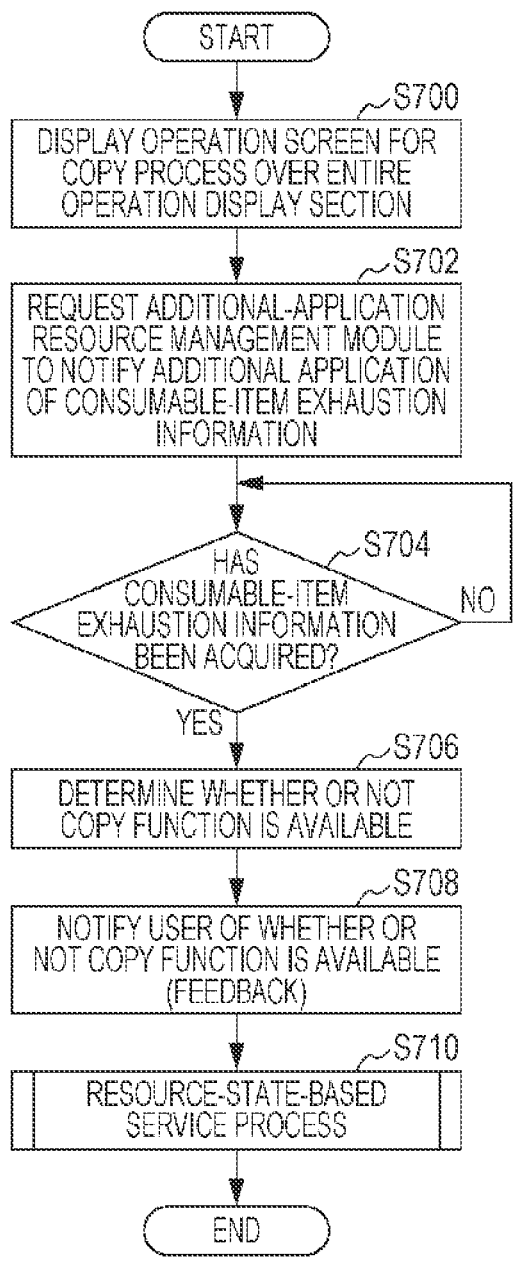
FIG. 13 is a flowchart illustrating an example of an operation of the additional application illustrated in FIG. 12.

FIG. 12 is a schematic diagram illustrating another example of the case where an additional application having a copy function is registered. FIG. 13 is a flowchart illustrating the procedure of a service process performed by the additional application illustrated in FIG. 12. Note that the numbers illustrated in FIG. 12 indicate that processes denoted by the numbers are performed in ascending order.

In the second specific example, as illustrated in FIG. 12, a "copy application" that provides a copy function to perform a copy process is registered as the additional application 200. The expression "consumable items" is set as resource information concerning the additional application 200. The additional application 200 is notified of "consumable-item exhaustion information" as resource-state information. The procedure of the process illustrated in FIG. 13 is started when the additional application 200 has been selected and an instruction to execute the additional application 200 has been provided.

As illustrated in FIG. 13, in step S700, the operation screen 202 for a copy process is displayed over the entire operation display section 14. Next, in step S702, the additional-application resource management module 112 is requested to notify the additional application 200 of consumable-item exhaustion information. Next, in step S704, whether or not consumable-item exhaustion information has been acquired from the additional-application resource management module 112 is determined. The determination process of step S704 is repeatedly performed until consumable-item exhaustion information is acquired. When consumable-item exhaustion information has been acquired, the process proceeds to step S706.

Next, in step S706, whether or not the copy function is available is determined on the basis of the consumable-item exhaustion information. Next, in step S708, the user is notified of whether or not the copy function is available. Whether or not the copy function is available is fed back to the user. For example, the operation screen 204 including the message display part 206 is displayed, and, in the message display part 206, a message, for example, "Copy is available" is displayed, thereby notifying the user that the copy function is available because the amounts of the consumable items which remain are sufficient. Next, in step S710, the "resource-state-based service process", which is described above, is performed, and the routine finishes.

Note that the procedure of the service process performed by the additional application illustrated in FIG. 13 is an example, and the process or the procedure may be changed. For example, only in the case where the copy function is not available because the amounts of the consumable items which remain are not sufficient, the user may be notified of whether or not the copy function is available. In other words, in the case where the copy function is available because the amounts of the consumable items which remain are sufficient, the process proceeds to step S710 without notifying the user of whether or not the copy function is available, and the "resource-state-based service process" may be performed.

Third Specific Example

A third specific example of the service providing apparatus will be described.

Figure 14:
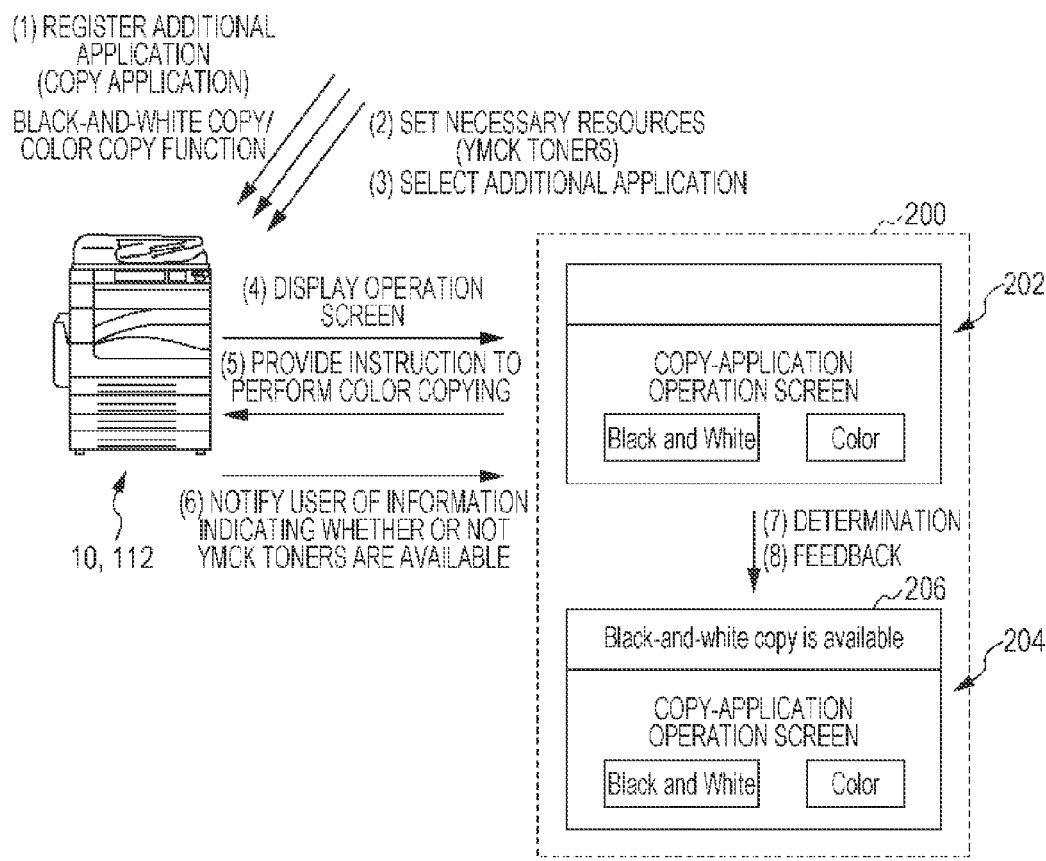
FIG. 14 is a schematic diagram illustrating another example of the case where an additional application having a copy function is registered.
Figure 15:
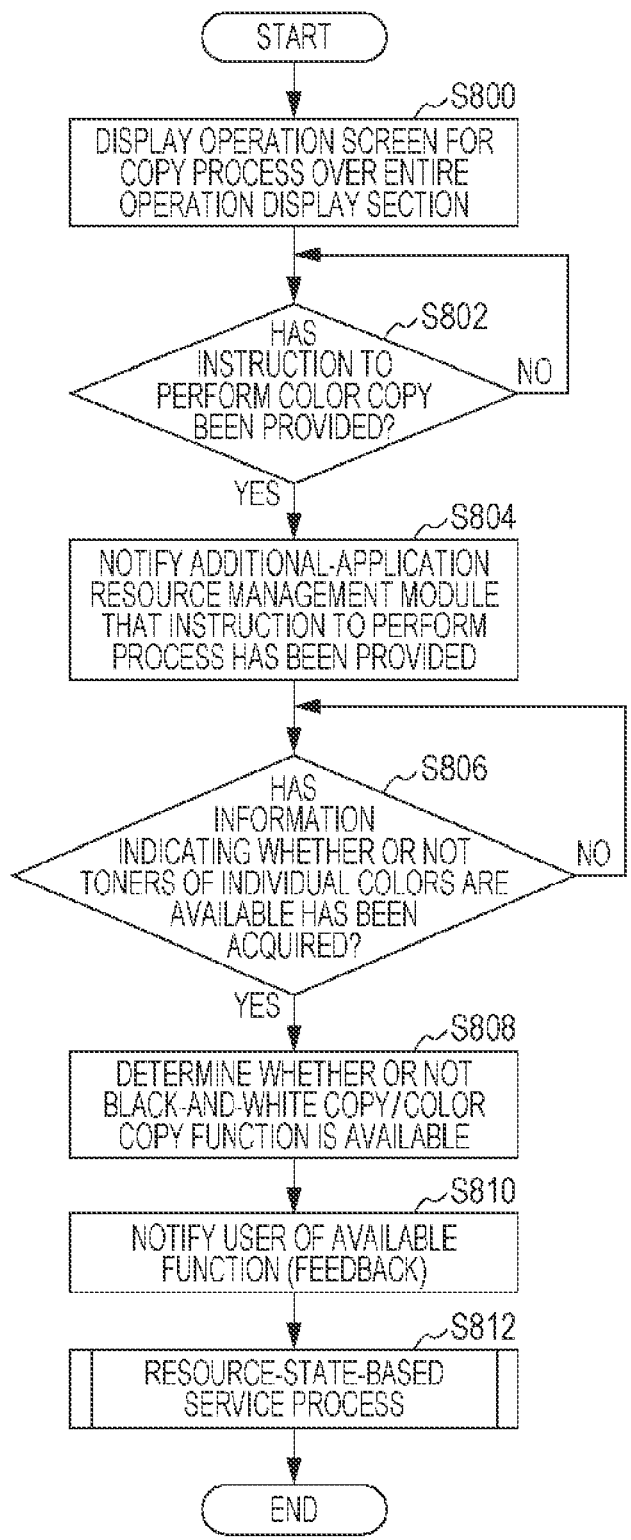
FIG. 15 is a flowchart illustrating an example of an operation of the additional application illustrated in FIG. 14.

FIG. 14 is a schematic diagram illustrating another example of the case where an additional application having a copy function is registered. FIG. 15 is a flowchart illustrating the procedure of a service process performed by the additional application illustrated in FIG. 14. Note that the numbers illustrated in FIG. 14 indicate that processes denoted by the numbers are performed in ascending order.

In the third specific example, as illustrated in FIG. 14, a "copy application" that provides a black-and-white copy function and a color copy function to perform a copy process is registered as the additional application 200. The expression "Y toner, M toner, C toner, K toner" is set as resource information concerning the additional application 200. The additional application 200 is notified of "information indicating whether or not the toners of the individual colors are available" as resource-state information. The procedure of the process illustrated in FIG. 15 is started when the additional application 200 has been selected and an instruction to execute the additional application 200 has been provided.

As illustrated in FIG. 15, in step S800, the operation screen 202 for a copy process is displayed over the entire operation display section 14. Next, in step S802, whether or not a setting operation performed by the user has been accepted and an instruction to perform a process for which settings have been set has been provided is determined. The determination process of step S802 is repeatedly performed until an instruction to perform a process for which settings have been set is provided. When an instruction to perform a process for which settings have been set has been provided, the process proceeds to step S804, and the additional-application resource management module 112 is notified that the instruction to perform the process has been provided.

Next, in step S806, whether or not information indicating whether or not the toners of the individual colors are available has been acquired from the additional-application resource management module 112 is determined. The determination process of step S806 is repeatedly performed until information indicating whether or not the toners of the individual colors are available is acquired. When information indicating whether or not the toners of the individual colors are available has been acquired, the process proceeds to step S808.

Next, in step S808, whether or not the black-and-white function and the color copy function are available is determined on the basis of the information indicating whether or not the toners of the individual colors are available. Next, in step S810, the user is notified of an available function. An available copy function is fed back to the user. For example, in the case where the Y toner, M toner, and C toner are not available and only the K toner is available, the operation screen 204 including the message display part 206 is displayed, and, in the message display part 206, a message, for example, "Black-and-white copy is available" is displayed. Next, in step S812, the "resource-state-based service process", which is described above, is performed, and the routine finishes.

Note that the procedure of the service process performed by the additional application illustrated in FIG. 15 is an example, and the process or the procedure may be changed. For example, the user may be notified of information indicating whether or not the toners of the individual colors are available, such as information indicating that the Y toner, M toner, and C toner are not available and only the K toner is available.

Fourth Specific Example

A fourth specific example of the service providing apparatus will be described.

Figure 16:
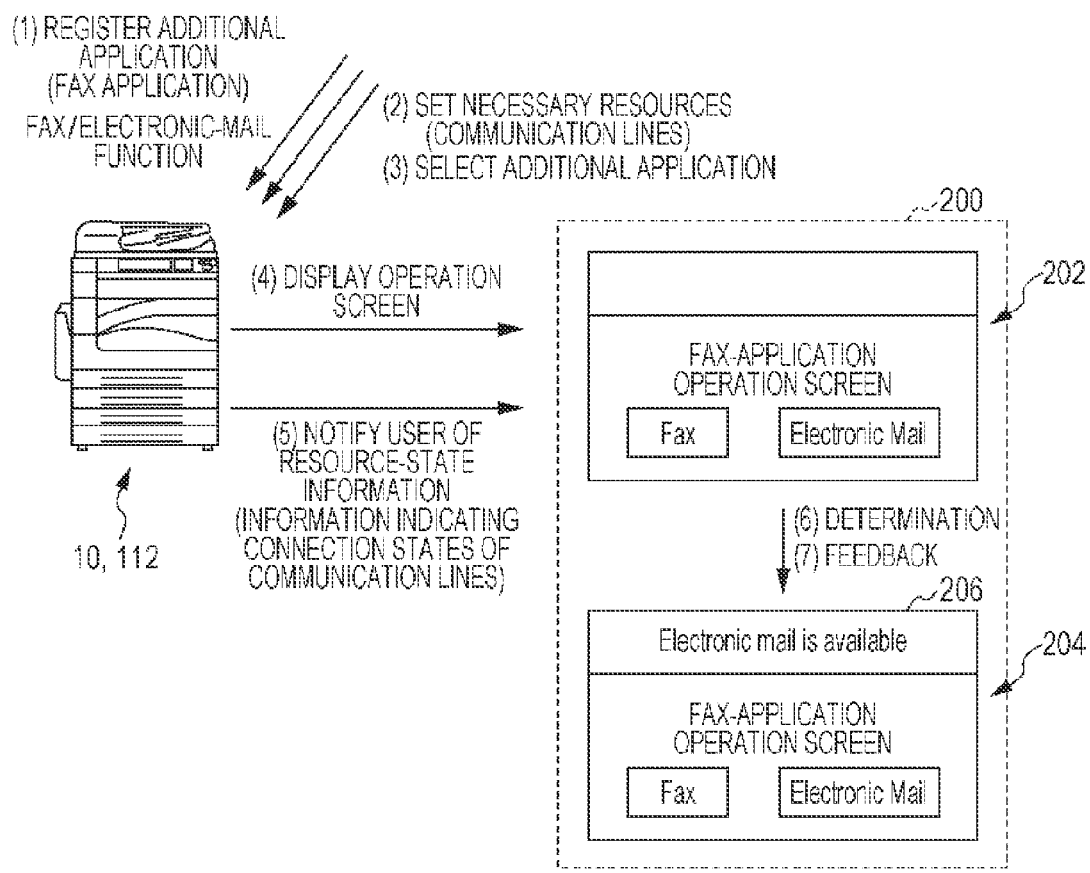
FIG. 16 is a schematic diagram illustrating an example of a case where an additional application having a facsimile function is registered.
Figure 17:
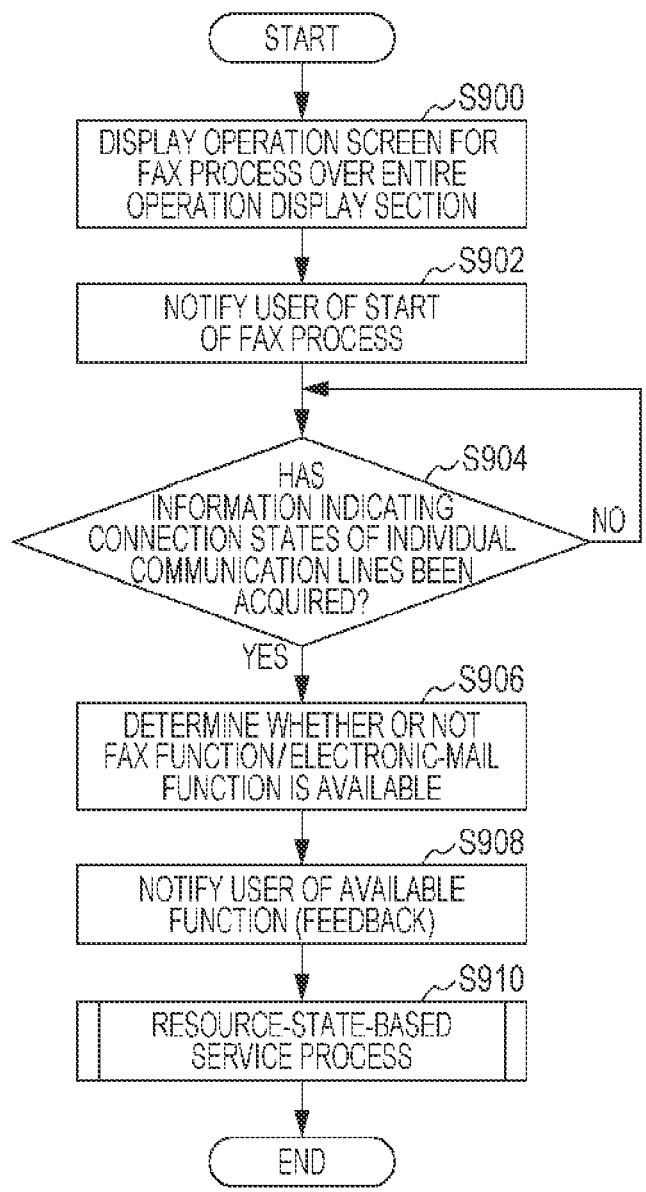
FIG. 17 is a flowchart illustrating an example of an operation of the additional application illustrated in FIG. 16.

FIG. 16 is a schematic diagram illustrating an example of a case where an additional application having a fax function is registered. FIG. 17 is a flowchart illustrating the procedure of a service process performed by the additional application illustrated in FIG. 16. Note that the numbers illustrated in FIG. 16 indicate that processes denoted by the numbers are performed in ascending order.

In the fourth specific example, as illustrated in FIG. 16, a "fax application" that provides a fax function to perform a fax process is registered as the additional application 200. The fax function here includes a typical fax function that uses a facsimile line such as a telephone line, and also includes an electronic-mail function that uses a network line (see FIG. 6A). An expression "connection states of the individual communication lines" is set as resource information concerning the additional application 200. The additional application 200 is notified of "information indicating the connection states of the individual communication lines" as resource-state information. The procedure of the process illustrated in FIG. 17 is started when the additional application 200 has been selected and an instruction to execute the additional application 200 has been provided.

As illustrated in FIG. 17, in step S900, the operation screen 202 for a fax process is displayed over the entire operation display section 14. Next, in step S902, the additional-application resource management module 112 is notified of the start of the fax process. Next, in step S904, whether or not information indicating the connection states of the individual communication lines has been acquired from the additional-application resource management module 112 is determined. The determination process of step S904 is repeatedly performed until information indicating the connection states of the individual communication lines is acquired. When information indicating the connection states of the individual communication lines has been acquired, the process proceeds to step S906.

Next, in step S906, whether or not the fax function and the electronic-mail function are available is determined on the basis of the information indicating the connection states of the individual communication lines. Next, in step S908, the user is notified of an available function. An available fax function is fed back to the user. For example, in the case where the facsimile line is not available because the facsimile line is disconnected and only the network line is available without any problem, the operation screen 204 including the message display part 206 is displayed, and, in the message display part 206, a message, for example, "Electronic mail is available" is displayed. The operation screen 204 that is displayed prompts the user to perform switching to the electronic-mail function. Next, in step S910, the "resource-state-based service process", which is described above, is performed, and the routine finishes.

Note that the procedure of the service process performed by the additional application illustrated in FIG. 17 is an example, and the process or the procedure may be changed. For example, when an additional application having only a typical fax function is used, the user may be notified of whether or not the fax function is available. Furthermore, when the fax function is not available, a setting may be set so that an application program having an electronic-mail function will be started.

Modification Examples

Note that configurations of the service providing apparatus, the service providing system, and the program that are described in the individual foregoing exemplary embodiments are examples. The configurations may be changed without departing from the scope of the present invention.

An example is described above, in which the additional application displays an operation screen including a message on the operation display section, thereby providing a notification for the user. However, the user may be notified of resource-state information in another notification method.

Display of resource-state information on a portion of an operation screen, e.g., display of a message using the message display part, may be performed. Alternatively, display of resource-state information so that the resource-state information is superimposed on an operation screen, e.g., display of a message on an operation screen, may be performed. The operation screen in such a case is not limited to the operation screen displayed by the additional application, and may be an operation screen displayed by the standard application. Furthermore, the additional application is not limited to an application program (a so-called "UI application") that displays an operation screen. Accordingly, the method for providing a notification for the user may be a notification method that uses sounds, a notification method that uses turning on and off of a lamp, or a notification method that uses, for example, the change of the settings of the additional application.

Moreover, the "resources that are necessary to perform a service process" are not limited to consumable items, and may be set in accordance with a service function. For example, fifth and sixth specific examples of the service providing apparatus, which are described below, may be provided.

In the fifth specific example, a "browser application" that provides a browser function is registered as the additional application 200. An expression "printable pages" is set as resource information concerning the additional application 200. When the printable pages are displayed by a browser, the additional application 200 is notified of "printable information" as resource-state information.

In the sixth specific example, a "multifunctional application" that uses a print-target display function which is used by the standard application is registered as the additional application 200. An expression "print targets displayed using the standard application" is set as resource information concerning the additional application 200. The additional application 200 is notified of "information concerning the selection states of the print targets" as resource-state information.

The additional application 200 performs a service process based on the information concerning the selection states of the print targets" that additional application 200 has been notified of. For example, in the case where the additional application 200 is a multifunction application that provides a function in which multiple functions are provided in combination and which is easily settable, when a print target is selected by the standard application, the user is notified that a copy function, a print function, and a fax function are available. In contrast, when no print target is selected by the standard application, the user is notified that only a scanner function is available.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. For example, the foregoing description of the exemplary embodiments might be realized using software or hardware modules. In the case, a program could be read from an external storage medium such as a compact disc-read-only memory (CD-ROM) storing the program, or the program is received through a communication network or the like. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A service providing apparatus comprising:
   a detection section that detects states of a plurality of resources of the service providing apparatus, the plurality of resources being resources to be used for providing a service;
   an acquisition section that, when an application program which is to perform a service process is added to the service providing apparatus and during a registration process for the application program prior to an executing of the application program, acquires resource information indicating a resource which is necessary for the added application program to perform the service process;
   a memory that stores, in association with the added application program, the acquired resource information and information of the service process so as to associate the resource information and the information of the service process with the added application program; and
   a notification section that, when the added application program is executed, specifies a resource which is associated with the added application program based on the resource information stored in the memory, determines whether it is necessary to notify the added application of the state of the specified resource, and, in a case where it is determined that it is necessary to notify the added application of the state of the specified resource, notifies the added application program of information indicating the detected state of the specified resource among the detected states of the plurality of resources.

2. The service providing apparatus according to claim 1, wherein the notification section notifies the added application program of the information indicating the detected state of the resource at least one of (1) at a time at which execution of the added application program is started, (2) at a time at which an instruction to perform the service process with the added application program is provided, and (3) in response to a notification request from the added application program.

3. The service providing apparatus according to claim 2, wherein the provision of a service includes at least one of provision of a copy function, provision of a print function, provision of a scan function, and provision of a facsimile function.

4. The service providing apparatus according to claim 1, wherein the provision of a service includes at least one of provision of a copy function, provision of a print function, provision of a scan function, and provision of a facsimile function.

5. The service providing apparatus according to claim 1, wherein, in a case where the resource is a consumable item, the state of the resource indicates at least one of an amount of the consumable item which remains, a fact that the amount of the consumable item which remains is insufficient, and whether or not the consumable item is available.

6. The service providing apparatus according to claim 1, wherein, in a case where the resource is a communication line, the state of the resource indicates a connection state of the communication line.

7. A service providing system comprising:
   vice providing apparatus according to claim 1; and
   an application program that is added to the service providing apparatus, and that notifies a user of information indicating a state of a resource which the application program has been notified of from the service providing apparatus, or notifies the user of whether or not provision of a service based on the information indicating the state of the resource is available.

8. The service providing apparatus according to claim 1, wherein:
   when the notification section obtains the detected state of the specified resource, the notification section determines to notify the added application program of information indicating the detected state of the specified resource when the added application is executed; and
   when the notification section obtains a detected state of an unspecified resource, the notification section determines not to notify the added application program of information indicating the detected state of the unspecified resource when the added application is executed, based on the information stored in the memory.

9. The service providing apparatus according to claim 1, wherein whether there exists alternative settings selectable as replacements for a current setting for the application program is determined based on the information indicating the detected state of the specified resource.

10. The service providing apparatus according to claim 9, further comprising an operation display that, when it is determined that there exists the alternative settings selectable as the replacements for the current setting, displays a screen prompting a user to change the current setting.

11. A service providing method comprising:
   detecting states of a plurality of resources of a service providing apparatus, the plurality of resources being resources to be used for providing a service;
   acquiring, when an application program which is to perform a service process is added to the service providing apparatus and during a registration process for the application program prior to an executing of the application program, resource information indicating a resource which is necessary for the added application program to perform the service process;
   storing, in association with the added application program, the acquired resource information and information of the service process so as to associate the resource information and the information of the service process with the added application program; and specifying, when the added application program is executed, a resource which is associated with the added application program based on the stored resource information, determining whether it is necessary to notify the added application of the state of the specified resource, and, in a case where it is determined that it is necessary to notify the added application of the state of the specified resource, notifying the added application program of information indicating the detected state of the specified resource among the detected states of the plurality of resources.

12. The service providing method according to claim 11, further comprising determining to change, by the application program, settings for the application program based on the information indicating the detected state of the specified resource.

13. The service providing method according to claim 12, wherein the determining to change the settings comprises, when a plurality of changed settings are available based on the information indicating the detected state of the specified resource, prompting a user to change the settings.

14. A non-transitory computer-readable medium storing a program causing a computer to execute a process, the process comprising:

acquiring states of a plurality of resources of a service providing apparatus, the plurality of resources being resources to be used for providing a service;

acquiring, when an application program which is to perform a service process is added to the service providing apparatus and during a registration process for the application program prior to an executing of the application program, resource information indicating a resource which is necessary for the added application program to perform the service process;

storing, in association with the added application program, the acquired resource information and information of the service process so as to associate the resource information and the information of the service process with the added application program; and specifying, when the added application program is executed, a resource which is associated with the added application program based on the stored resource information, determining whether it is necessary to notify the added application of the state of the specified resource, and, in a case where it is determined that it is necessary to notify the added application of the state of the specified resource, notifying the added application program of information indicating the acquired state of the specified resource among the acquired states of the plurality of resources.

* * * * *